UNITED STATES PATENT OFFICE.

WERNER STAUFEN, OF PRUSSIA.

IMPROVEMENT IN PREPARING VEGETABLE FIBER FOR STUFFING MATTRESSES AND CUSHIONS.

Specification forming part of Letters Patent No. 16,293, dated December 23, 1856.

*To all whom it may concern:*

Be it known that I, WERNER STAUFEN, of Prussia, but now residing at No. 9, Baker Street, Portman Square, London, England, have invented or produced a new manufacture in the shape of an artificially-curled vegetable fibrous substance, which has proved itself to be a cleanly, elastic, and most excellent substitute for hair as a stuffing for mattresses, cushions, &c.; and I do hereby declare that the following is a full and exact description of the process employed by me in producing the said curled vegetable fiber.

I take any suitable vegetable fibrous substance after its fibers have been separated from all extraneous matter and subject the same to the process of twisting, and the said twists or ropes thus formed are then immersed in water and allowed to remain therein until the fibers of which they are composed become perfectly soft and pliable. The said twists or ropes are then removed from the water and subjected to such a degree of heat as to thoroughly dry them. The said twists or ropes may be then picked to pieces, and the fibers of which they are composed will be found to be permanently curled and fully as elastic as the said fibers were in their natural state.

The clean fibers of a vegetable substance grown in Mexico, and commercially known as "Mexican Grass," I have used in the preparation of my improved elastic vegetable stuffing material for mattresses, &c., and find that it answers the purpose admirably. Any other tough elastic vegetable fibrous substance whose fiber is of suitable size can also be subjected to my said curling and fixing process.

Previous to subjecting the vegetable fibers to the twisting portion of the aforesaid process I sometimes glaze them by any convenient method, for the purpose of hardening them, and also of improving the appearance of the finished stuffing material.

When it is desired to give the prepared stuffing material the appearance of hair, the fibers should be first dyed and then glazed before subjecting them to the twisting part of my said process. Vegetable fibers may perhaps be curled and fixed in that state by first softening them and then twisting them while in that condition, preparatory to the drying of the twists. Twisting and softening vegetable fibers, or softening and twisting the same preparatory to the drying part of my method of curling and fixing in that shape vegetable fibers, I consider as being the same in principle.

What I claim as my invention, and desire to secure by Letters Patent as a new manufacture, is—

An article for stuffing mattresses, cushions, &c., produced by permanently curling any suitable vegetable fibrous substance by the method substantially as herein set forth.

The above specification of my new production in the shape of a curled vegetable fibrous substance to be used as a substitute for other articles for filling mattresses, &c., signed this 4th of November, 1856.

WERNER STAUFEN.

Witnesses:
   Z. C. ROBBINS,
   E. Y. ROBBINS.